April 11, 1944.  C. E. FRASER  2,346,216
FILTER CLEANER WITH BED SETTLING CHAMBER
Filed June 25, 1940

INVENTOR.
CHARLES E. FRASER,
BY Ellis S. Middleton
ATTORNEY.

Patented Apr. 11, 1944

2,346,216

UNITED STATES PATENT OFFICE 2,346,216

FILTER CLEANER WITH BED SETTLING CHAMBER

Charles E. Fraser, Kew Gardens, N. Y.

Application June 25, 1940, Serial No. 342,254

6 Claims. (Cl. 210—128)

The present invention relates to a method of and mechanism for cleaning filter beds.

It is common practice in the treatment of sewage, industrial wastes, etc., to pass liquids containing the same through relatively shallow beds of sand, aggregate or the like, which removes the solids therefrom. Such beds, in the course of time, become clogged with the retained material, even though the raw material undergoing treatment has been subjected to preliminary treatment such as sedimentation or the like. As a consequence, it becomes necessary to restore the bed to somewhere near its initial solid removal capacity and this may be done by cleaning it either intermittently or continuously.

A popular type of cleaning mechanism for the above purpose consists of a travelling cleaner operated above the bed, which includes a cleaner caisson. The caisson is intended to make a sealing contact with the portion of the bed immediately thereunder and this is accomplished usually by extending the side walls of the caisson into the bed material a sufficient distance and by providing sealing means, such as hollow, rotating drums at each end of the caisson and sliding contact along the sides. Consequently, the small portion of the bed which is being cleaned is temporarily completely cut off from a filtering action.

The cleaner caisson may be divided into two compartments, in the first of which the filter bed material is agitated and the retained solids loosened therefrom, the wash water resulting from such action passing over into the second or wash water compartment from which it is removed by a pump for disposal or further treatment.

The above mechanism is applicable both to upflow and downflow filters.

In downflow filters, it is customary to flow the unfiltered influent, with or without previous treatment, such as sedimentation, directly on top of the filter bed, the liquid passing through the bed, the solids being caught thereby and clean effluent resulting. This effluent then moves from beneath the bed and into a disposal channel, the level of which is maintained slightly below the level of influent so as to provide a sufficient hydraulic head to cause liquid movement through the bed. As the resistance of a filter bed changes from time to time due to the quantum of retained solids therein, means are provided for varying the hydraulic head between the influent and effluent levels. This usually consists in arranging the parts so that the influent will automatically build up to a higher level than that of the effluent. This may conveniently take the form of an adjustable weir on the effluent discharge. This weir may be automatically operated within a narrow range, by a float on the influent side of the filter.

A convenient method of agitating a portion of the filter bed to clean the same may take the form of an intermittently operated solenoid where the bed material is of the magnetite sand variety. This electromagnet, submerged in the liquid, being located relatively close to the bed, when energized for the space of about a second, lifts a section of the magnetite sand immediately thereunder and this movement and the subsequent dropping of the sand back into the bed, tends to separate the solids caught by the sand therefrom. Inasmuch as the lifting of this magnetite creates a zone of lessened resistance in the bed at that point, if, as in a downflow filter, the effluent level is higher than the wash water level in the solenoid compartment in the caisson, there will be a back rush of clean effluent up through the bed at the area of lessened resistance, which washes the loosened solids from the magnetite, over the partition between the agitation compartment and wash water box and into the latter from which it is removed by a pump. This cleaning procedure may take place continuously.

Other mechanism for creating the area of agitation in the bed other than an electromagnet may consist of pipes projecting a suitable distance into the bed material either to simply disturb the bed or this disturbance may be facilitated by injecting air or other liquid through the pipes. These methods of agitation are also suitable for a bed of sand or other aggregate not of the magnetite variety.

In upflow filters, much the same procedure takes place although in that case, the influent to be filtered flows from beneath the bed, up through the bed material, the clean effluent being on top thereof. As before, the influent level must be above that of the effluent in order to induce this hydraulic flow. Likewise, the cleaner mechanism creates an area of agitation in the bed, but in this case, the flood of water through the area of lessened resistance caused thereby is that of unfiltered influent from below the bed, thus carrying the loosened dirt over the wash water weir and into the wash water box where it is removed by a pump.

In both cases, it is to be noted that the cleaner caisson defines an area of resistance against the flow of liquid therethrough and is cut off from the liquid surrounding it by the seals which exist at the side and ends thereof and that consequently, no filtering action takes place in the area covered by the cleaning mechanism.

The main function of the seals is to assist the wash water pump to create a back head and prevent the wash water from contaminating the effluent. In the case of downflow filters, the seals also prevent the unfiltered influent from above the bed leaking into the cleaner caisson and from thence through the bed at its area of lessened resistance to thus contaminate the clean effluent below. In the case of upflow filters, the seal prevents the rush of unfiltered influent moving up through the area of lessened resistance in the bed from leaking outwardly through the cleaner caisson to contaminate the clean effluent above the bed.

During the cleaning operation where there is an upflow of liquid through the zone of agitation, the wash water carrying the dirt flows into a compartment from which it is removed. In order to reach the wash water compartment for removal, the dirty water usually flows over the top of an intermediate wall which may or may not be topped with an adjustable weir. In so doing, there is a tendency to carry with it some of the sand or bed aggregate which is subsequently lost. This is due to the fact that such intermediate wall is usually of restricted extent and consequently a large amount of liquid at high velocity must pass thereover during such operation.

It is a principal object of the present invention to prevent this loss of bed material by providing a settling chamber between the zone of agitation and the wash water box so that the velocity of upflowing wash water will have an opportunity to settle and consequently drop therefrom any bed material suspended therein.

This is accomplished by providing a wall or baffle to form a settling chamber between the agitation channel and the wash water box having a volume increasing in the direction of its height. As a result, the velocity of the upflowing water gradually diminishes before spilling over the weir into the wash water box, thus preventing loss of bed material.

The invention further consists in the novel arrangement, combination and construction of parts more fully hereinafter described and shown in the accompanying drawing, in which—

Figure 1:
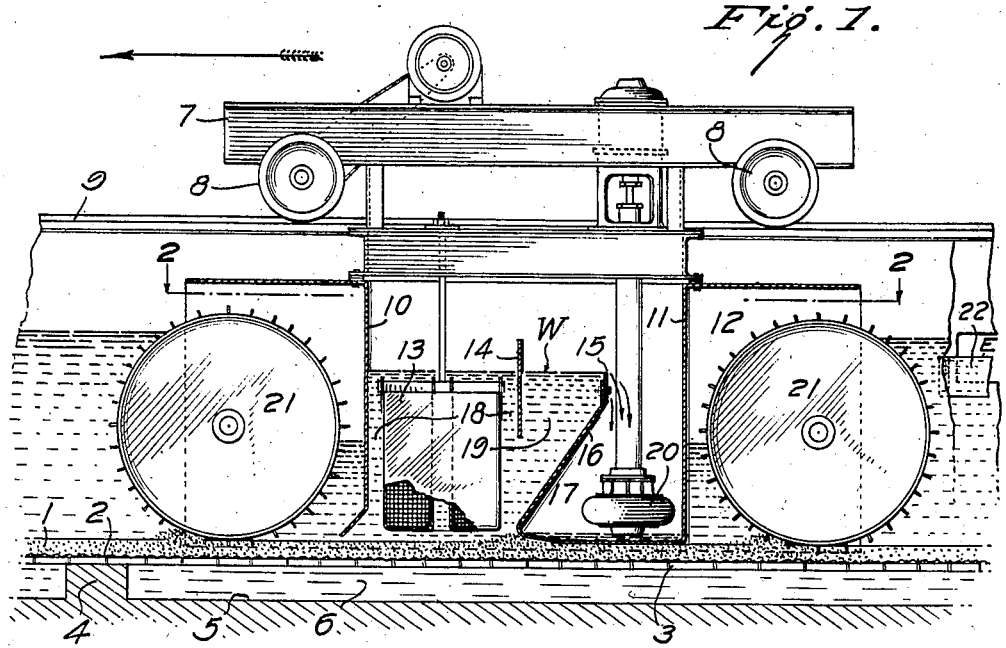
Fig. 1 is a side elevation partly in section of an apparatus embodying the present invention.
Figure 2:
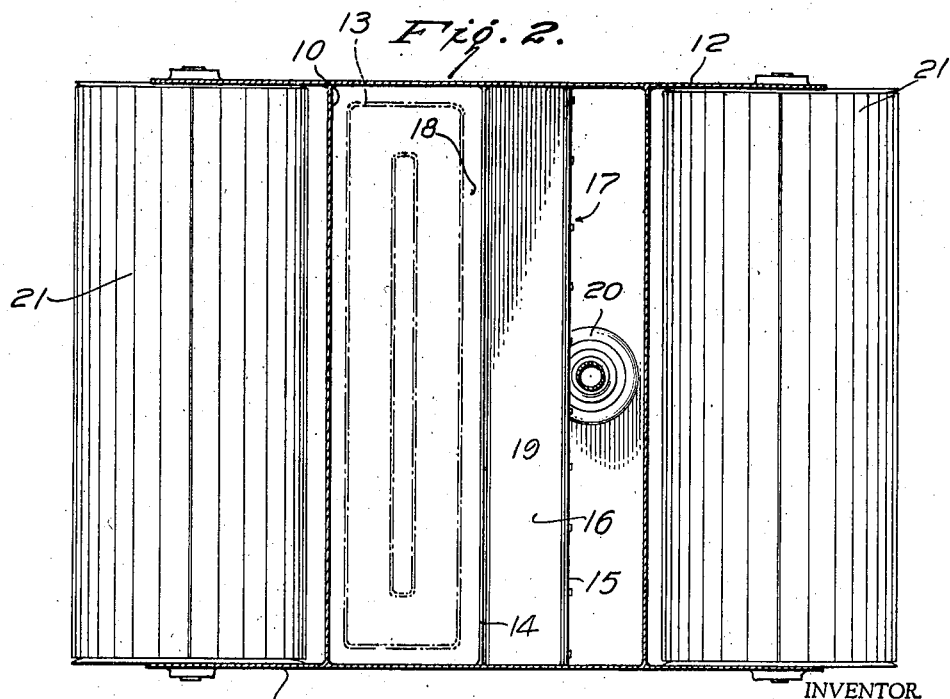
Fig. 2 is a plan view along the line 2—2 of Fig. 1.

Referring now to Fig. 1, the usual filter bed is shown at 1 of sand, such as that of the magnetite or silica variety or any other aggregate or filter media. A suitable thickness of bed material rests upon the screen 2 supported by grid 3 resting upon the top of wall 4 so as to slightly space the grid from the bottom 5 of the filter tank leaving a space 6 therein.

A suitable cleaning mechanism may consist of trolley 7 movable through wheels 8 driven by any suitable source of power, on trackway 9. Depending from the trolley is a caisson having front wall 10, rear wall 11 and side walls 12. A solenoid 13 or other agitation creating means is located between the front and rear walls 10 and 11 and adjacent a baffle 14 extending materially above the top of adjustable weir 15 on front wall 16 of the wash water box 17. There is thus formed an agitation channel 18 occupied by the agitation creating means, and a settling chamber 19 between the baffle 14 and the front wall 16 of the wash water box. A pump 20 in the wash water compartment is used for removing dirty water therefrom.

At the front and rear of the cleaner and mounted between side walls 12 thereof, are rotatable sealing drums 21 making water tight connection with the side walls 12 and the top of the bed material 1. The side walls extend a sufficient distance into the bed material so that with the drums 21 an area of the bed is effectively sealed against a filtering operation during the cleaning period.

In a downflow filtering system, influent to a desired level I is flowed on top of the bed, the liquid passing therethrough, clean effluent moving through the space 6, up a vertical channel and over an adjustable weir 22 for further disposal. This weir determines the effluent level E at an elevation sufficiently lower than influent level I so as to create a hydraulic head tending to move liquid through the bed in a downward direction.

During a cleaning operation, the weir 15 at the front edge of the wash water compartment 17 is adjusted so as to establish the wash water level W sufficiently lower than effluent level E so that when an area of agitation is created in the bed below the channel 18, with a consequent area of lessened resistance in the bed, clean effluent will rise through the bed at that point, wash the retained solids therefrom, passing through settling compartment 19, where the velocity of upflow of washing water is lessened thereby dropping any suspended bed material, the wash water containing the loosened dirt passing over weir 15 into wash water compartment 17 where it is removed by the pump 20.

As shown, a solenoid 13 may be used as the agitation creating means by suitable connection to an intermittent source of electrical energy so as to energize the same. Upon establishing this connection, where the sand of the bed is of the magnetite variety, the latter is magnetized and an area thereof bodily lifted up toward the solenoid, which loosens the dirt adherent to and caught by the sand. During this time, clean effluent carries the loosened dirt into the wash water compartment as above described.

When the solenoid is deenergized, it releases the magnetite, which drops back into the bed substantially clean. This cleaning operation is then repeated intermittently until the entire area of the bed has been subjected to the purging action.

While a solenoid has been shown as the agitation creating means, yet the invention is not limited thereto inasmuch as any type of agitator may be used in combination with the settling chamber as shown.

Best results have been shown to be obtained when the agitation creating means travels ahead of the wash water compartment with its intermediate settling chamber. Consequently, the type of apparatus shown is particularly adapted for use on circular filter beds where the cleaner travels in one direction only. However, the combination described is still suitable for back and forth travel over rectangular beds even though in one direction of travel the wash water box leads the agitator.

Such a combination makes possible the use of filter bed aggregate of a much smaller size than has heretofore been possible. This is for the reason that the settling chamber provided intermediate the agitation channel and the wash water box gives this fine aggregate an opportunity to settle which it did not have in devices not constructed as described. As a consequence, the losses of filter bed material passing into the wash water box and removed by the pump are minimized.

Such a combination also makes possible, with larger aggregate, a greater difference in hydraulic head between effluent level E and wash water level W so that a greater volume of upflowing water may be used to more completely wash the dirt held by the bed.

It is to be understood, of course, that the instrumentalities above described are equally applicable to upflow filters, the only difference being that instead of clean effluent rising through the area of agitation to wash the dirt from the bed I, influent serves this purpose, clean effluent being on top of the bed.

While the invention has been shown and described with particular reference to specific embodiments, it is to be understood that it is not to be limited thereto but is to be construed broadly and restricted solely by the scope of the appended claims.

I claim:

1. A cleaner for filter beds including means for making sealing contact with a filter bed to seal off an area thereof from a filtering action, means to create a zone of agitation in the bed in said area, a wash water compartment to receive dirty water from the zone of agitation, one side of said wash water compartment in said area being inclined away from the zone of agitation and separating the zone of agitation from the wash water compartment, means cooperating with said inclined side wall to form an intermediate settling chamber between the wash water compartment and the zone of agitation, and means to remove dirty water from the wash water compartment.

2. The cleaner of claim 1 in which the settling chamber has a bottom area less than its top area.

3. The cleaner of claim 1 in which the inclined side of the wash water compartment partly overhangs the means for removing wash water.

4. The cleaner of claim 1 in which the cooperating means is a partition terminating short of the upper surface of the bed.

5. A method of cleaning a filter bed without shutting down the filter which includes the steps of sealing off an area of the bed from a filtering action by means effective upon the upper side of the bed, creating a zone of agitation in said area by raising a portion of the filter bed, washing the bed material in said zone by causing an upflow of water in the zone of the raised portion of the bed, thereby carrying upwardly bed material and loosened dirt, decreasing the velocity of the upflowing water as it is about to be removed by increasing the effective area of the passageway therefor to thereby drop therefrom the bed material, passing the flowing dirty water into a wash water compartment separated by an inclined wall from the zone of agitation and removing the dirty water therefrom.

6. A method of cleaning a filter bed without shutting down the filter which includes the steps of sealing off an area of the bed from a filtering action by means effective upon the upper side of the bed, creating a zone of agitation in said area, washing the bed material in said zone by causing an upflow of water in the zone, thereby carrying upwardly bed material and loosened dirt, decreasing the velocity of the upflowing water as it is about to pass into a wash water compartment by increasing the effective area of the passageway therefor to thereby drop therefrom the bed material, passing the flowing dirty water into a wash water compartment separated by an inclined wall from the zone of agitation and removing the dirty water therefrom.

CHARLES E. FRASER.